US010838601B2

(12) United States Patent
Chen et al.

(10) Patent No.: US 10,838,601 B2
(45) Date of Patent: Nov. 17, 2020

(54) PROCESSING METHOD AND TERMINAL

(71) Applicant: Huawei Technologies Co., Ltd., Shenzhen (CN)

(72) Inventors: Xin Chen, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/308,342

(22) PCT Filed: Jun. 8, 2016

(86) PCT No.: PCT/CN2016/085364
§ 371 (c)(1),
(2) Date: Dec. 7, 2018

(87) PCT Pub. No.: WO2017/210908
PCT Pub. Date: Dec. 14, 2017

(65) Prior Publication Data
US 2019/0212903 A1    Jul. 11, 2019

(51) Int. Cl.
*G06T 17/00*     (2006.01)
*G06F 3/0484*    (2013.01)
*H04N 21/81*     (2011.01)
*H04N 21/472*    (2011.01)
*H04N 21/4728*   (2011.01)
(Continued)

(52) U.S. Cl.
CPC ........ *G06F 3/04845* (2013.01); *G06F 3/0485* (2013.01); *G06F 3/04883* (2013.01); *G06T 7/74* (2017.01); *H04N 21/23418* (2013.01); *H04N 21/44008* (2013.01); *H04N 21/4728* (2013.01);
(Continued)

(58) Field of Classification Search
CPC ............ G06F 3/04845; G06F 3/04883; G06K 9/4671; G06T 7/74
See application file for complete search history.

(56) References Cited

U.S. PATENT DOCUMENTS

2002/0156775 A1* 10/2002 Yamamoto .......... G06F 16/5838
2007/0183493 A1*  8/2007 Kimpe ................ G06F 21/6245
                                                         375/240.1
(Continued)

FOREIGN PATENT DOCUMENTS

CN    102625981 A    8/2012
CN    103064921 A    4/2013
(Continued)

OTHER PUBLICATIONS

Foreign Communication From a Counterpart Application, European Application No. 16904360.1, Extended European Search Report dated Mar. 14, 2019, 8 pages.
(Continued)

*Primary Examiner* — Charles Tseng
(74) *Attorney, Agent, or Firm* — Conley Rose, P.C.

(57) ABSTRACT

A terminal obtains feature information of target content of a first picture, obtains, according to the feature information, at least one second picture whose at least one degree of matching with the first picture is greater than a preset threshold and whose definition is higher than that of the first picture, and displays the at least one second picture. Hence, the terminal provides a picture with a higher definition to a user.

20 Claims, 14 Drawing Sheets

(51) Int. Cl.
*H04N 21/234* (2011.01)
*H04N 21/44* (2011.01)
*G06T 7/73* (2017.01)
*G06F 3/0485* (2013.01)
*G06F 3/0488* (2013.01)

(52) U.S. Cl.
CPC ... *H04N 21/47205* (2013.01); *H04N 21/8153* (2013.01)

(56) References Cited

U.S. PATENT DOCUMENTS

| | | | |
|---|---|---|---|
| 2009/0193021 | A1 | 7/2009 | Gupta et al. |
| 2010/0183229 | A1* | 7/2010 | Ruzon ............... G06K 9/6211 382/197 |
| 2010/0331041 | A1 | 12/2010 | Liao et al. |
| 2012/0007866 | A1 | 1/2012 | Tahan |
| 2013/0254330 | A1 | 9/2013 | Maylander et al. |
| 2014/0327786 | A1 | 11/2014 | Grob et al. |
| 2015/0055017 | A1* | 2/2015 | Begeja ............... H04N 5/44591 348/565 |
| 2015/0070357 | A1 | 3/2015 | Tahan |
| 2015/0347464 | A1 | 12/2015 | Takata et al. |
| 2015/0350565 | A1 | 12/2015 | Rapport |
| 2015/0356245 | A1 | 12/2015 | Kozuka et al. |

FOREIGN PATENT DOCUMENTS

| | | |
|---|---|---|
| CN | 103155585 A | 6/2013 |
| CN | 103473565 A | 12/2013 |
| CN | 103093680 B | 3/2014 |
| CN | 104991702 A | 10/2015 |
| CN | 105389094 A | 3/2016 |
| JP | 2011008752 A | 1/2011 |
| JP | 2011511348 A | 4/2011 |
| JP | 2014023158 A | 2/2014 |
| JP | 2014197802 A | 10/2014 |
| JP | 2016012346 A | 1/2016 |
| WO | 2012021246 A2 | 2/2012 |

OTHER PUBLICATIONS

Machine Translation and Abstract of Chinese Publication No. CN104991702, Oct. 21, 2015, 24 pages.
Machine Translation and Abstract of Chinese Publication No. CN105389094, Mar. 9, 2016, 18 pages.
Foreign Communication From a Counterpart Application, Chinese Application No. 201680060697.9, Chinese Office Action dated Jul. 1, 2019, 8 pages.
Machine Translation and Abstract of Chinese Publication No. CN103064921, Apr. 24, 2013, 9 pages.
Machine Translation and Abstract of Chinese Publication No. CN103093680, Mar. 5, 2014, 15 pages.
Machine Translation and Abstract of Chinese Publication No. CN103473565, Dec. 25, 2013, 23 pages.
Machine Translation and Abstract of Japanese Publication No. JP2014197802, Oct. 16, 2014, 30 pages.
Foreign Communication From a Counterpart Application, PCT Application No. PCT/CN2016/085364, English Translation of International Search Report dated Feb. 17, 2017, 2 pages.
Foreign Communication From a Counterpart Application, PCT Application No. PCT/CN2016/085364, English Translation of Written Opinion dated Feb. 17, 2017, 5 pages.

* cited by examiner

PROCESSING METHOD AND TERMINAL

CROSS-REFERENCE TO RELATED APPLICATIONS

This application is a U.S. National Stage of International Patent Application No. PCT/CN2016/085364 filed on Jun. 8, 2016, which is hereby incorporated by reference in its entirety.

TECHNICAL FIELD

Embodiments of the present invention relate to wireless communications technologies, and in particular, to a processing method and a terminal.

BACKGROUND

Currently, terminals with a photographing function are increasingly widely applied to life. When a terminal takes a photograph, a picture photographed by the terminal is not clear due to the terminal's own reason or an external reason. For example, a specific region of the photographed picture is not clear due to limited pixels (Pixels Per Inch, PPI) of the terminal. For another example, the photographed picture is not clear because the terminal is relatively far away from a photographed object.

When a user browses a picture displayed by a terminal, if a region of interest of the user in the picture is not displayed clearly, the user continually zooms out this region by using the terminal, and views target content within a maximum zooming factor supported by the terminal. For a picture with a poor definition, even if target content displayed in the picture is zoomed out using the maximum zooming factor supported by the terminal, the target content still cannot be displayed clearly.

SUMMARY

This specification provides a processing method and a terminal. The terminal obtains feature information of target content of a first picture; obtains, according to the feature information, one or more second pictures whose degree/degrees of matching with the first picture is/are greater than a preset threshold and whose definition/definitions is/are higher than that of the first picture; and then displays the second picture.

According to a first aspect, a picture display method is provided, applied to a terminal provided with a display screen. The method is described from a perspective of a terminal. In the method, the terminal displays a first picture on the display screen; and when detecting a preset gesture acting on the first picture, triggers the following events in response to the preset gesture: determining target content of the first picture according to the preset gesture; obtaining feature information of the target content; obtaining one or more second pictures according to the feature information, where a matching degree between the second picture and the first picture is greater than a preset threshold, and a definition of the second picture is higher than that of the first picture; and displaying at least one of the one or more second pictures.

The terminal obtains the feature information of the target content of the first picture; obtains, according to the feature information, the one or more second pictures whose degree/degrees of matching with the first picture is/are greater than the preset threshold and whose definition/definitions is/are higher than that of the first picture; and then displays the second picture, so as to provide a picture with a higher definition to a user.

In a possible implementation, the feature information includes a feature descriptor, and the terminal extracts feature points from the target content to obtain a first feature point set, and generates a feature descriptor for each feature point in the first feature point set. In this process, the terminal locally extracts the feature points from the target content, to obtain the feature descriptors.

In a possible implementation, that a matching degree between the second picture and the first picture is greater than a preset threshold includes that: feature points that are among feature points in the second picture and that match feature points in the first feature point set form a second feature point set, and a ratio of a quantity of feature points in the second feature point set to a quantity of feature points in the first feature point set is greater than the preset threshold, where a distance between feature descriptors respectively corresponding to two matched feature points is less than a first threshold.

In a possible implementation, that a definition of the second picture is higher than that of the first picture includes that:

feature points that are among feature points in the second picture and that match feature points in the first feature point set form a second feature point set, an average distance between the feature points and a central point that are in the second feature point set is greater than a second threshold, the central point is an average value of coordinates of the feature points in the second feature point set, and a distance between each feature point and the central point is a quantity of pixels between the feature point and the central point, where the second threshold is an average distance between the feature points and a central point that are in the first feature point set.

In a possible implementation, the preset gesture is a zoom-out gesture, and the determining target content of the first picture according to the preset gesture includes: using display content on the display screen as the target content.

In a possible implementation, the preset gesture is a circle gesture, and the determining target content of the first picture according to the preset gesture includes: using content circled by the circle gesture, as the target content.

In a possible implementation, the feature information further includes at least one of Global Positioning System GPS information or inertial measurement unit IMU information.

In a possible implementation, the displaying at least one of the one or more second pictures includes: displaying a picture with the highest definition among the one or more second pictures; or displaying all of the one or more second pictures; or displaying at least one of the one or more second pictures in a scrolling manner.

In a possible implementation, when the displaying at least one of the one or more second pictures is specifically displaying a picture with the highest definition among the one or more second pictures, the method further includes: detecting another preset gesture acting on the display; and displaying another second picture in response to the another preset gesture, where a definition of the another second picture is less than that of the picture with the highest definition.

In a possible implementation, after the displaying the another second picture, the method further includes: redisplaying the second picture with the highest definition.

In a possible implementation, before the displaying at least one of the one or more second pictures, the method further includes: determining a transform matrix between the at least one second picture and the first picture; and transforming the at least one second picture according to the transform matrix; and the displaying at least one of the one or more second pictures includes:

displaying the transformed at least one second picture.

In a possible implementation, the obtaining one or more second pictures according to the feature information includes:

obtaining the one or more second pictures from a memory of the terminal according to the feature information; or obtaining the one or more second pictures from a server according to the feature information.

In a possible implementation, the obtaining one or more second pictures according to the feature information includes: obtaining the one or more second pictures from a memory of the terminal according to the feature information; and when no second picture is obtained from the memory, sending the feature information to a server, and receiving one or more second pictures sent according to the feature information by the server.

According to a second aspect, a picture display method is provided, applicable to a server that stores a picture. In the method, the server receives feature information that is of target content and that is sent by a terminal, where the target content is determined from a first picture by the terminal according to a preset gesture, and the first picture is displayed on a display screen of the terminal; obtains one or more second pictures according to the feature information, where a matching degree between the second picture and the first picture is greater than a preset threshold, and a definition of the second picture is higher than that of the first picture; and sends the one or more second pictures to the terminal, to trigger the terminal to display at least one of the one or more second pictures.

The server receives the feature information that is of the target content and that is sent by the terminal; obtains, according to the feature information, the one or more second pictures whose degree/degrees of matching with the first picture is/are greater than the preset threshold and whose definition/definitions is/are higher than that of the first picture; and then returns the second picture to the terminal, so that the terminal displays the second picture, thereby providing a picture with a higher definition to a user.

In a possible implementation, the feature information includes a feature descriptor, where the feature descriptor is generated, after the terminal extracts feature points from the target content to obtain a first feature point set, for each feature point in the first feature point set.

In a possible implementation, the feature information includes the target content, and before the obtaining one or more second pictures according to the feature information, the method further includes:

extracting feature points from the target content to obtain a first feature point set, and generating a feature descriptor for each feature point in the first feature point set.

In a possible implementation, that a definition of the second picture is higher than that of the first picture includes that:

feature points that are among feature points in the second picture and that match feature points in the first feature point set form a second feature point set, an average distance between the feature points and a central point that are in the second feature point set is greater than the second threshold, the central point is an average value of coordinates of the feature points in the second feature point set, and a distance between each feature point and the central point is a quantity of pixels between the feature point and the central point, where the second threshold is an average distance between the feature points and a central point that are in the first feature point set.

In a possible implementation, before the obtaining one or more second pictures according to the feature information, the method further includes:

receiving either Global Positioning System GPS information or inertial measurement unit IMU information that is of the first picture and that is sent by the terminal, or both; and determining a first set from the stored pictures according to the GPS information, and determining a second set from the stored pictures according to the IMU information, where a picture in the first set has the same photographing location information as the first picture, and a picture in the second set has the same photographing orientation information as the first picture; and the obtaining one or more second pictures according to the feature information includes:

obtaining the one or more second pictures from the first set and the second set according to the feature information.

A third aspect provides a method, applied to a terminal provided with a display screen, including:

detecting a zoom-out gesture acting on a first picture, where the picture is displayed on the display screen; and in response to the zoom-out gesture, determining that a zoom-out factor of the first picture is less than a preset value, and zooming out the first picture; or determining that a zooming factor of the first picture is not less than the preset value, and triggering the following events: determining target content of the first picture; obtaining feature information of the target content; obtaining one or more second pictures according to the feature information; and displaying at least one of the one or more second pictures, where a matching degree between the second picture and the first picture is greater than a preset threshold, and a definition of the second picture is higher than that of the first picture.

All of the possible implementations of the first aspect are also applicable to the third aspect.

A fourth aspect provides a terminal, including:

a display, configured to display a first picture; and a processor, configured to: detect a preset gesture acting on the first picture, and trigger the following events in response to the preset gesture: determining target content of the first picture according to the preset gesture, obtaining feature information of the target content, and obtaining one or more second pictures according to the feature information, where a matching degree between the second picture and the first picture is greater than a preset threshold, and a definition of the second picture is higher than that of the first picture, where the display is further configured to display at least one of the one or more second pictures.

In a possible implementation, the feature information includes a feature descriptor, and the obtaining feature information of the target content includes:

extracting, by the processor, feature points from the target content to obtain a first feature point set, and generating a feature descriptor for each feature point in the first feature point set.

In a possible implementation, that a definition of the second picture is higher than that of the first picture includes that:

feature points that are among feature points in the second picture and that match feature points in the first feature point set form a second feature point set, an average distance between the feature points and a central point that are in the second feature point set is greater than the second threshold, the central point is an average value of coordinates of the feature points in the second feature point set, and a distance between each feature point and the central point is a quantity of pixels between the feature point and the central point, where the second threshold is an average distance between the feature points and a central point that are in the first feature point set.

In a possible implementation, the preset gesture is a zoom-out gesture, and the processor is specifically configured to use display content on the display screen as the target content.

In a possible implementation, the preset gesture is a circle gesture, and the processor is specifically configured to use content circled by the circle gesture, as the target content.

In a possible implementation, the feature information further includes at least one of Global Positioning System GPS information or inertial measurement unit IMU information.

In a possible implementation, that the display is further configured to display at least one of the one or more second pictures includes that:

the display is further configured to display a picture with the highest definition among the one or more second pictures; or display all of the one or more second pictures; or display at least one of the one or more second pictures in a scrolling manner.

In a possible implementation, when the display specifically displays the picture with the highest definition among the one or more second pictures, the processor is further configured to: detect another preset gesture acting on the display; and respond to the another preset gesture, to cause the display to display another second picture, where a definition of the another second picture is less than that of the picture with the highest definition.

In a possible implementation, the processor is further configured to: before the display displays the at least one second picture of the one or more second pictures, determine a transform matrix between the at least one second picture and the first picture; and transform the at least one second picture according to the transform matrix; and the display is specifically configured to display the transformed at least one second picture.

In a possible implementation, that the processor is configured to obtain one or more second pictures according to the feature information includes that:

the processor is configured to obtain the one or more second pictures from a memory of the terminal according to the feature information; or obtain the one or more second pictures from a server according to the feature information.

In a possible implementation, the terminal further includes a transceiver, configured to: when the processor obtains no second picture from a memory of the terminal, send the feature information to a server, and receive one or more second pictures sent according to the feature information by the server.

A fifth aspect provides a terminal, including: a processor, a memory, a communications interface, a system bus, and a display, where the memory and the communications interface are connected to and communicate with the processor by using the system bus, the memory is configured to store a computer-executable instruction, the communications interface is configured to communicate with another device, and the processor is configured to run the computer-executable instruction, to cause the terminal to perform the method provided in any one of the first aspect or the possible implementations of the first aspect, or any one of the third aspect or the possible implementations of the third aspect.

A sixth aspect provides a server, including:

a memory, configured to store a picture;

a transceiver, configured to receive feature information that is of target content and that is sent by a terminal, where the target content is determined by the terminal from a first picture according to a preset gesture, and the first picture is displayed on a display screen of the terminal; and a processor, configured to obtain one or more second pictures according to the feature information, where a matching degree between the second picture and the first picture is greater than a preset threshold, and a definition of the second picture is higher than that of the first picture, where the transceiver is further configured to send the one or more second pictures to the terminal, so that the terminal displays at least one of the one or more second pictures.

In a possible implementation, the feature information includes a feature descriptor, where the feature descriptor is generated, after the terminal extracts feature points from the target content to obtain a first feature point set, for each feature point in the first feature point set.

In a possible implementation, the feature information includes the target content, and the processor is further configured to: extract feature points from the target content to obtain a first feature point set, and generate a feature descriptor for each feature point in the first feature point set.

In a possible implementation, feature points that are among feature points in the second picture and that match feature points in the first feature point set form a second feature point set, an average distance between the feature points and a central point that are in the second feature point set is greater than the second threshold, the central point is an average value of coordinates of the feature points in the second feature point set, and a distance between each feature point and the central point is a quantity of pixels between the feature point and the central point, where the second threshold is an average distance between the feature points and a central point that are in the first feature point set.

In a possible implementation, the transceiver is further configured to: before the processor obtains the one or more second pictures according to the feature information, receive either Global Positioning System GPS information or inertial measurement unit IMU information that is of the first picture and that is sent by the terminal, or both; and the processor is further configured to: determine a first set from the stored pictures according to the GPS information, and determine a second set from the stored pictures according to the IMU information, where a picture in the first set has the same photographing location information as the first picture, and a picture in the second set has the same photographing orientation information as the first picture; and obtain the one or more second pictures from the first set and the second set according to the feature information.

A seventh aspect provides a server, including: a processor, a memory, a communications interface, and a system bus, where the memory and the communications interface are connected to and communicate with the processor by using the system bus, the memory is configured to store a computer-executable instruction, the communications interface is configured to communicate with another device, and the processor is configured to run the computer-executable instruction, to cause the server to perform the method provided in any one of the second aspect or the possible implementations of the second aspect.

An eighth aspect provides a terminal. The terminal has a function of implementing terminal behaviors in the foregoing method designs. The function may be implemented by hardware or by executing corresponding software by hardware. The hardware or software includes one or more units that is/are corresponding to the foregoing function.

In a possible design, a structure of the terminal includes a processor and a transmitter. The processor is configured to support a first terminal in performing a corresponding function in the foregoing method. The transmitter is configured to support communication between terminals, and send, to a terminal, the information or instruction used in the foregoing method. The terminal may further include a memory, and the memory is configured to couple to the processor, and stores a program instruction and data that are necessary for the terminal.

A ninth aspect provides a server. The server has a function of implementing server behaviors in the foregoing method designs. The function may be implemented by hardware or by executing corresponding software by hardware. The hardware or software includes one or more units that is/are corresponding to the foregoing function. The modules may be software and/or hardware.

In a possible design, a structure of the server includes a processor and a transmitter. The processor is configured to support the server in performing a corresponding function in the foregoing method. The transmitter is configured to support communication between the server and a base station, and receive the information or instruction that is sent by the base station and that is used in the foregoing method. The server may further include a memory, and the memory is configured to couple to the processor, and stores a program instruction and data that are necessary for the base station.

A tenth aspect provides a communications system, where the system includes the server and the terminal according to the foregoing aspects.

An eleventh aspect provides a computer storage medium, configured to store a computer-executable instruction used by the foregoing terminal, where the computer-executable instruction includes an instruction used to perform the method provided in any one of the first aspect or the possible implementations of the first aspect, or any one of the third aspect or the possible implementations of the third aspect.

A twelfth aspect provides a computer storage medium, configured to store a computer-executable instruction used by the foregoing server, where the computer-executable instruction includes an instruction used to perform the method provided in any one of the second aspect or the possible implementations of the second aspect.

A thirteenth aspect provides a chip system, including: at least one processor, a memory, an input/output part, and a bus, where the at least one processor obtains an instruction from the memory by using the bus, to implement a design function of the terminal used in the foregoing method.

A fourteenth aspect provides a chip system, including: at least one processor, a memory, an input/output part, and a bus, where the at least one processor obtains an instruction from the memory by using the bus, to implement a design function of the server used in the foregoing method.

A fifteenth aspect provides a computer readable storage medium storing one or more programs, where when the one or more programs are executed by a terminal, the terminal performs the steps of the foregoing method applied to a terminal.

A sixteenth aspect provides a graphical user interface on a terminal, where the terminal includes a display, a memory, a plurality of application programs, and one or more processors configured to execute one or more programs stored in the memory; and the graphical user interface includes a user interface displayed in the foregoing method applied to a terminal.

To sum up, the terminal obtains the feature information of the target content of the first picture; obtains, according to the feature information, the one or more second pictures whose degree/degrees of matching with the first picture is/are greater than the preset threshold and whose definition/definitions is/are higher than that of the first picture; and then displays the second picture. In this process, the terminal obtains the feature information of the target content of the first picture; obtains, according to the feature information, the one or more second pictures whose degree/degrees of matching with the first picture is/are greater than the preset threshold and whose definition/definitions is/are higher than that of the first picture; and then displays the second picture, so as to provide a picture with a higher definition to a user.

DESCRIPTION OF EMBODIMENTS

When a user browses a picture on a terminal, if a region of interest in the picture is not displayed clearly, the user continually zooms out target content, and views the target content within a maximum zooming factor supported by the terminal.

However, for a picture with a poor definition, even if target content displayed in the picture is zoomed out using the maximum zooming factor supported by the terminal, the target content still cannot be displayed clearly.

In view of this, the embodiments of the present invention provide a picture display method and a terminal. The terminal obtains feature information of target content of a first picture; obtains, according to the feature information, one or more second pictures whose degree/degrees of matching with the first picture is/are greater than a preset threshold and whose definition/definitions is/are higher than that of the first picture; and then displays the second picture.

In the embodiments of the present invention, the terminal may obtain, according to the feature information, one or more first pictures from pictures stored locally. In addition, the terminal may alternatively send the feature information to a server, and the server obtains, according to the feature information, a second picture from pictures stored in the server. In this case, in addition to having a basic input/output module, the terminal also needs to be capable of connecting to the server. A connection manner may be Bluetooth, Wi-Fi, the Internet, or the like. When the terminal interacts with the server to obtain the second picture, an architecture diagram of a system to which the embodiments of the present invention are applicable is shown in FIG. 1.

Figure 1:
FIG. 1 is a schematic diagram of a system to which a picture display method according to an embodiment of the present invention is applicable.

FIG. 1 is a schematic diagram of a system to which a picture display method according to an embodiment of the present invention is applicable. As shown in FIG. 1, this embodiment of the present invention relates to a terminal and/or a server.

Specifically, the terminal in this embodiment of the present invention may be a terminal provided with a display screen, or the like. The terminal may be a device providing voice and/or data connectivity for a user, a handheld device with a wireless connection function, or another processing device connected to a wireless modem. The terminal may communicate with one or more core networks through a radio access network (for example, RAN, Radio Access Network). The terminal may be a mobile terminal, such as a mobile phone (also referred to as a "cellular" phone) or a computer with a mobile terminal. For example, the terminal may be a portable mobile apparatus, a pocket-sized mobile apparatus, a handheld mobile apparatus, a computer built-in mobile apparatus, or an in-vehicle mobile apparatus, where the mobile apparatus exchanges voice and/or data with the radio access network.

The following uses an example in which the terminal locally obtains one or more second pictures, to describe the present invention in detail. For details, refer to FIG. 2.

Figure 2:
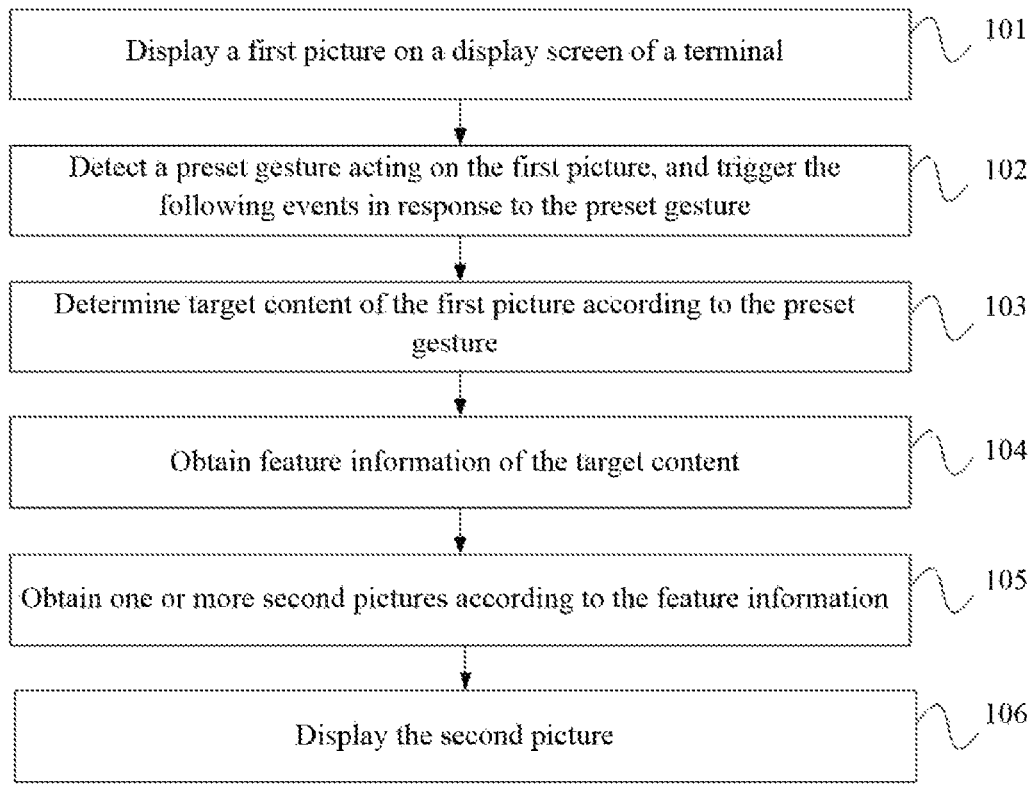
FIG. 2 is a schematic diagram of a picture display method according to an embodiment of the present invention.

FIG. 2 is a schematic diagram of a picture display method according to an embodiment of the present invention. This embodiment of the present invention is applicable to a scenario in which a terminal is required to display a second picture that matches target content and whose definition is higher than that of the target content. Specifically, this embodiment of the present invention includes the following steps.

101. A terminal displays a first picture on a display screen of the terminal.

102. The terminal detects a preset gesture acting on the first picture, and triggers the following events in response to the preset gesture.

103. The terminal determines target content of the first picture according to the preset gesture.

When a user browses a picture, if a region of interest of the user in the picture is not clearly displayed, the user performs an operation on the first picture, so that the terminal determines the target content from the first picture. For example, the preset gesture is a zoom-out gesture, and the terminal determines the target content from the first picture according to the zoom-out gesture. For another example, the preset gesture is a circle gesture, and the terminal uses a region circled by the circle gesture, as the target content. Different preset gestures may be understood as different trigger conditions.

104. The terminal obtains feature information of the target content.

105. The terminal obtains one or more second pictures according to the feature information.

In 104 and 105, after determining the target content, the terminal obtains the feature information of the target content, and finds the second picture that matches the first picture according to the feature information. A matching degree between the second picture and the first picture is greater than a preset threshold, and a definition of the second picture is higher than that of the second picture.

For two feature points in different pictures, respective feature descriptors of the two feature points are calculated, and if the two feature descriptors have similarity, for example, a Euclidean distance between the two feature descriptors is less than a first threshold, it is considered that the feature points respectively corresponding to the two feature descriptors are matched. In this way, a feature point may be tracked between different pictures. In addition, feature point tracking may also be understood as feature point matching.

In a possible design, the terminal finds, from pictures stored locally, at least one second picture that matches the first picture. The second picture includes the target content of the first picture, a matching degree between the second picture and the first picture is greater than the preset threshold, and a definition of the second picture is higher than that of the first picture. Generally, higher pixel density indicates a higher definition.

In a feature point matching process, for any stored to-be-matched picture, the terminal extracts feature points from the to-be-matched picture. Feature points that are among these feature points and that match feature points in a first feature point set form a second feature point set. If a ratio of a quantity of feature points in the second feature point set to a quantity of feature points in the first feature point set is greater than the preset threshold, whether an average distance between the feature points and a central point that are in the second feature point set is greater than a second threshold is further determined. If the average distance is greater than the second threshold, it is considered that the to-be-matched picture is a second picture. The central point is an average value of coordinates of the feature points, and a distance between each feature point and the central point is a quantity of pixels between the feature point and the central point. The second threshold is an average distance between the feature points and a central point that are in the first feature point set, or is a preset value.

For example, a total quantity of feature points in the first feature point set is 10. For a specific to-be-matched picture among the pictures stored by the terminal, the terminal extracts feature points from the to-be-matched picture. Feature points that are among these feature points and that match feature points in the first feature point set form a second feature point set. Assuming that the second feature point set includes eight feature points, and that a ratio of the quantity of feature points in the second feature point set to the quantity of feature points in the first feature point set is 80%, if the preset threshold is less than 80%, it indicates that a matching degree between the to-be-matched picture and the first picture is greater than the preset threshold. In this case, whether an average distance between the feature points and the central point that are in the second feature point set is greater than the second threshold is further determined. If the average distance is greater than the second threshold, it is considered that the to-be-matched picture is a second picture.

In the foregoing matching process, if the ratio of the quantity of feature points in the second feature point set to the quantity of feature points in the first feature point set is not greater than the preset threshold, it indicates that the to-be-matched picture does not match the first picture, and there is no need to further determine whether the average distance between the feature points and the central point that are in the second feature point set is greater than the second threshold. In addition, even if the ratio of the quantity of feature points in the second feature point set to the quantity of feature points in the first feature point set is greater than the preset threshold, if the average distance between the feature points and the central point that are in the second feature point set is not greater than the second threshold, that is, if a definition of the to-be-matched picture is not higher than the second threshold, it indicates that the to-be-matched picture cannot be used as a second picture.

106. The terminal displays the second picture.

After obtaining the one or more second pictures, the terminal displays at least one second picture. For example, the terminal displays a picture with the highest definition among the one or more second pictures. For another example, the terminal displays all of the one or more second pictures. For still another example, the terminal displays at least one of the one or more second pictures in a scrolling manner.

According to the picture display method provided in this embodiment of the present invention, the terminal obtains the feature information of the target content of the first picture; obtains, according to the feature information, the one or more second pictures whose degree/degrees of matching with the first picture is/are greater than the preset threshold and whose definition/definitions is/are higher than that of the first picture; and then displays the second picture, so as to provide a picture with a higher definition to the user.

In the foregoing embodiment shown in FIG. 2, the terminal finds, from the pictures stored locally, at least one second picture that matches the first picture. However, the present invention is not limited thereto. In another feasible implementation, for example, based on FIG. 1, the terminal may alternatively send the feature information to a server, and the server finds the second picture that matches the first picture. In the sending process, if the server is a remote server, the terminal sends information about the target content to the remote server by using a network, Wi-Fi, Bluetooth, or the like. In a possible implementation, the terminal may alternatively first look, in a memory of the terminal, for a second picture that matches the first picture. If one or more matching second pictures are found, the terminal displays at least one of the one or more second pictures. If no matching second picture is found, the terminal sends the feature information to a server and receives one or more matching second pictures found by the server.

Figure 3:
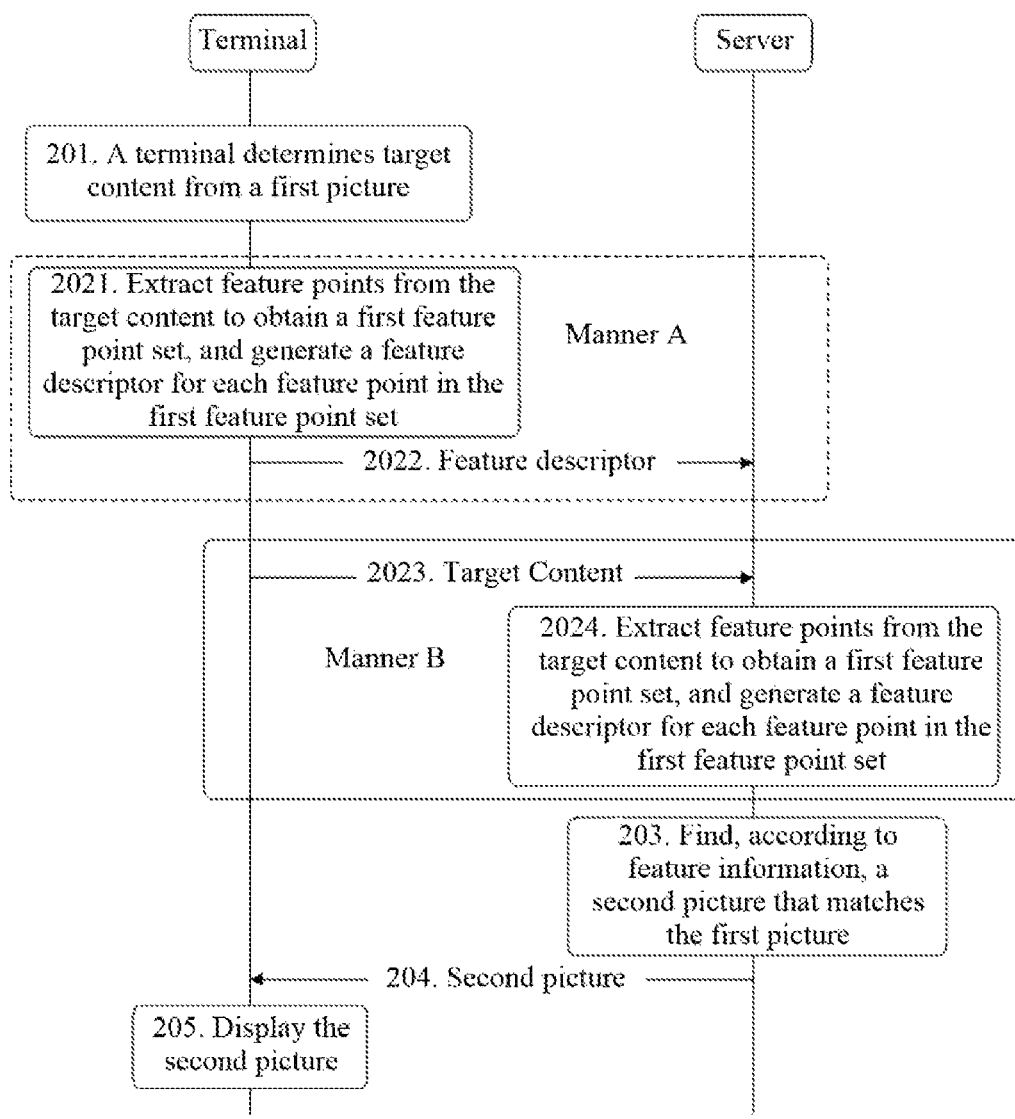
FIG. 3 is a schematic diagram of another picture display method according to an embodiment of the present invention.

FIG. 3 is a schematic diagram of another picture display method according to an embodiment of the present invention. The method includes the following steps.

201. A terminal determines target content from a first picture.

After determining the target content, the terminal sends feature information to a server, so that the server finds a second picture that matches the first picture according to the feature information. Specifically, the feature information may be sent in a manner A or a manner B depending on specific content of the feature information.

The manner A includes the following steps:

2021. The terminal extracts feature points from the target content to obtain a first feature point set, and generates a feature descriptor for each feature point in the first feature point set.

2022. The terminal sends the feature descriptor to a server.

The manner B includes the following steps:

2023. The terminal sends the target content to a server.

2024. The server extracts feature points from the target content to obtain a first feature point set, and generates a feature descriptor for each feature point in the first feature point set.

In the manner A and the manner B, a feature point in a picture is a point that is located in a region with dramatically changing grayscale values, that is relatively easy to be distinguished from a surrounding pixel, and that is easy to be detected, for example, a corner (Corner) of a rectangular frame in the picture. The point may usually be described by a feature descriptor (Feature Description) that is calculated by using pixels in a region around the point. The feature descriptor includes scale-invariant feature transform (Scale Invariant Feature Transform, SIFT), speeded up robust features (Speeded Up Robust Features, SURF), a histogram of oriented gradients (Histogram of Oriented Gradients, HOG), or the like. The feature descriptor is usually an n-dimensional vector. The feature descriptor is generated by using a histogram of oriented gradients in which gradient values are weighted and that is constructed by using pixels in a specific range around the feature point.

It should be noted that the manner A and the manner B are parallel solutions, and in practice, one alternative is selected.

203. The server finds, according to the feature information, a second picture that matches the first picture.

204. The server sends the second picture to the terminal.

205. The terminal displays the second picture.

Next, with reference to FIG. 1, the picture content retrieval method in the present invention is described in detail by using several specific embodiments.

Figure 4:
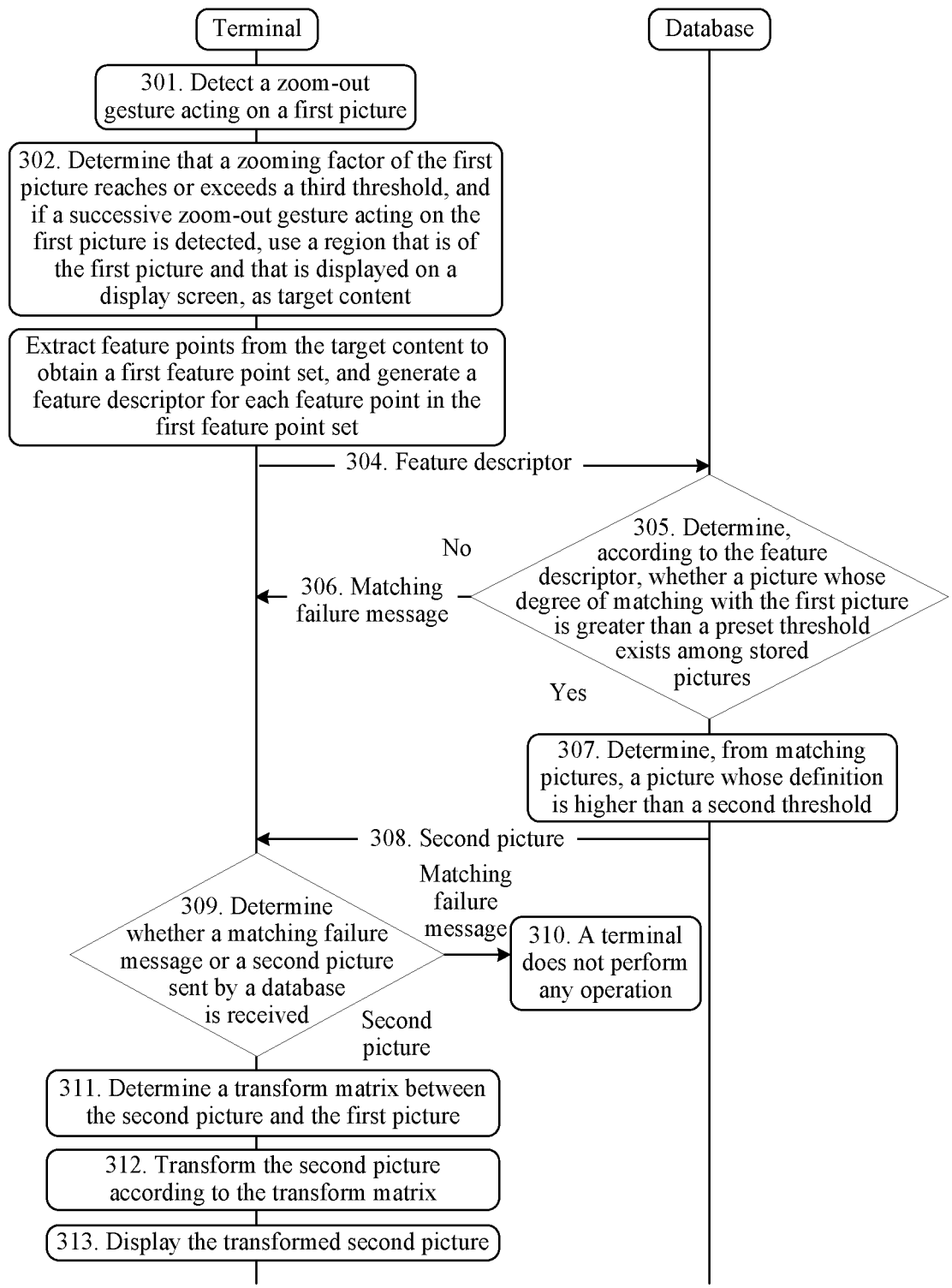
FIG. 4 is a schematic diagram of another picture display method according to an embodiment of the present invention.

FIG. 4 is a schematic diagram of another picture display method according to an embodiment of the present invention. In this embodiment of the present invention, a preset gesture is specifically a zoom-out gesture. Specifically, this embodiment of the present invention includes the following steps.

301. A terminal detects a zoom-out gesture acting on a first picture.

In this step, a user zooms out the first picture by using the zoom-out gesture, for example, by using pinch-to-zoom. Correspondingly, the terminal zooms out the first picture in response to the zoom-out gesture.

302. The terminal determines that a zooming factor of the first picture has reached or exceeded a third threshold, and if a successive zoom-out gesture acting on the first picture is detected, uses a region that is of the first picture and that is displayed on a display screen, as target content.

When the zooming factor of the first picture has reached or exceeded the third threshold, and the terminal determines that the user is still continuing zooming out the first picture, the terminal uses the region that is of the first picture and that is displayed on the display screen, as the target content of the user. In this case, the target content may also be referred to as a visible region. For details, refer to FIG. 5A.

Figure 5A:
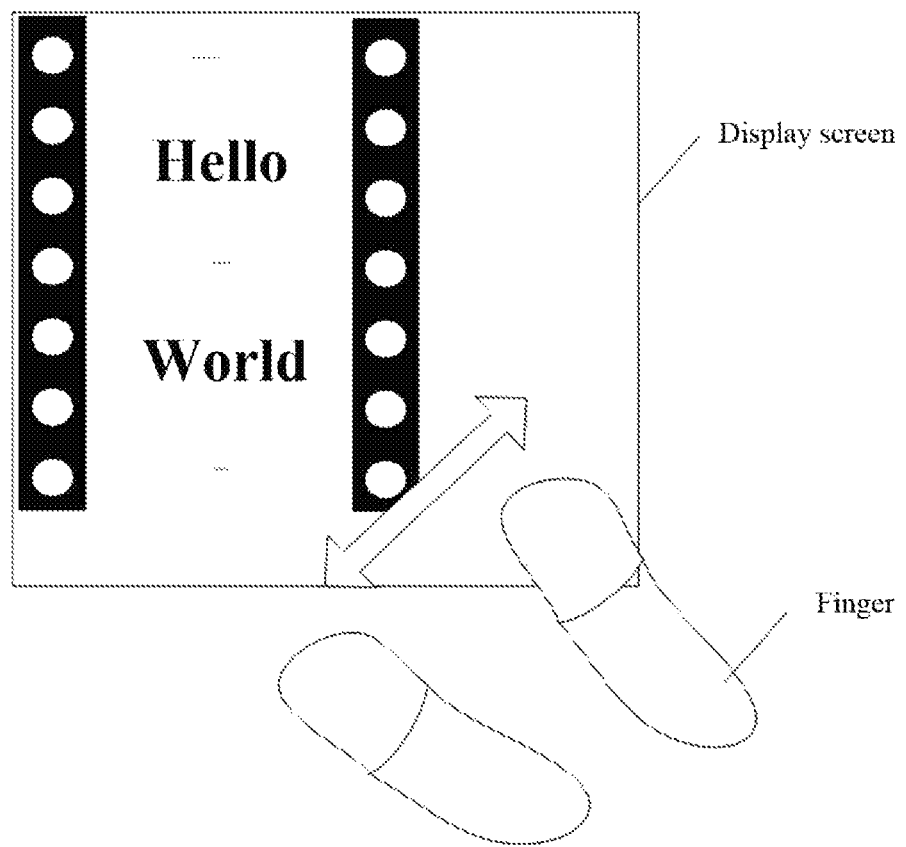
FIG. 5A is a schematic diagram of a first picture according to an embodiment of the present invention.

FIG. 5A is a schematic diagram of a first picture according to an embodiment of the present invention. As shown in FIG. 5A, a user has zoomed out the first picture using a maximum zooming factor supported by a terminal, but still cannot clearly see words other than "Hello" and "World". When the user attempts to zoom out the first picture again, the terminal considers that the user still does not see the first picture clearly. In this case, the user uses a region that is of the first picture and that is displayed on a display screen, as target content.

303. The terminal extracts feature points from the target content to obtain a first feature point set, and generates a feature descriptor for each feature point in the first feature point set.

304. The terminal sends the feature descriptor to a server.

Optionally, in this step, in addition to sending the feature descriptor, the terminal may send Global Positioning System (Global Positioning System, GPS) information and/or inertial measurement unit (Inertial Measurement Unit, IMU) information of the first picture.

305. The server determines, according to the feature descriptor, whether a picture whose degree of matching with the first picture is greater than a preset threshold exists among stored pictures, and if the picture exists among the stored pictures, performs step 307; otherwise, performs step 306.

In this step, the server determines, according to the feature descriptor, whether the picture whose degree of matching with the first picture is greater than the preset threshold exists among the stored pictures, and uses the picture whose degree of matching with the first picture is greater than the preset threshold, as a matching picture. The picture whose matching degree is greater than the preset threshold means that: Feature points that are among feature points in the picture and that match feature points in the first feature point set form a second feature point set, and a ratio of a quantity of feature points in the second feature point set to a quantity of feature points in the first feature point set is greater than a first threshold.

It should be noted that, in the foregoing step 304, the terminal further sends the GPS information and the IMU information of the first picture to the server, and in this step, the server further determines a first set from the stored pictures according to the GPS information, and/or determines a second set from the stored pictures according to the IMU information. A picture in the first set has the same photographing location information as the first picture, and a picture in the second set has the same photographing orientation information as the first picture. Then, the server finds, according to the feature descriptor, a second picture that matches the first picture from the first set and/or the second set. In this process, the server does not extract feature points from all the stored pictures, but selects some pictures from the stored pictures, extracts feature points from the some pictures, and performs matching between these feature points and feature points in the first picture. In this way, the server can make a smaller second picture search range, so as to shorten a search time.

306. The server sends a matching failure message to the terminal.

307. The server determines, from matching pictures, a picture whose definition is higher than a second threshold.

In this embodiment of the present invention, the picture that is determined from the matching pictures and whose definition is higher than the second threshold is a second picture. The server determines, from all pictures whose degrees of matching with the first picture are greater than the preset threshold, a picture in which an average distance between the feature points and a central point that are in the second feature point set is greater than the second threshold, and uses the matching picture as the second picture.

Figure 6:
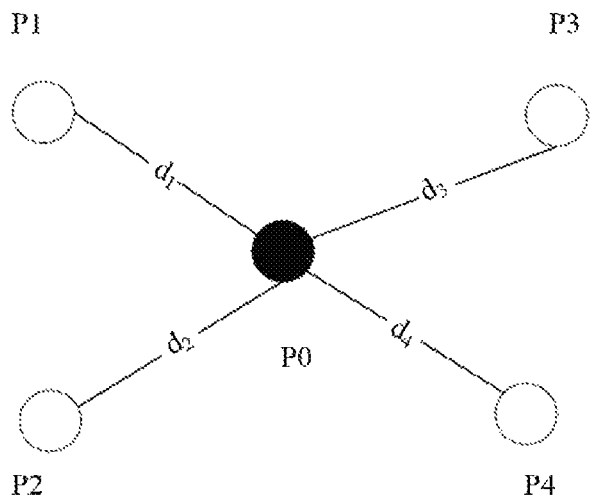
FIG. 6 is a schematic diagram of determining an average distance according to an embodiment of the present invention.

In the foregoing process, for a manner of calculating the average distance, refer to FIG. 6.

FIG. 6 is a schematic diagram of determining an average distance according to an embodiment of the present invention. Referring to FIG. 6, it is assumed that a second feature point set formed by feature points that are among feature points in a matching picture and that match feature points in a first feature point set includes four feature points. The four feature points are shown by hollow circles, and a central point in this feature point set is shown by a solid circle. Assuming that coordinates of the four feature points are P1(x1,y1), P2(x2,y2), P3(x3,y3), and P4(x4,y4), respectively, a coordinate of the central point is $$P0\left(\frac{\sum_{i=1}^{4} x_i}{4}, \frac{\sum_{i=1}^{4} y_i}{4}\right).$$

Then, distances between P0 and the four feature points are determined as $$d_j = \sqrt{\left(\frac{\sum_{i=1}^{4} x_i}{4} - x_j\right)^2 + \left(\frac{\sum_{i=1}^{4} y_i}{4} - y_j\right)^2},$$

where $j=1, \ldots, 4$. It can be learned from this that an average distance is $$\overline{d} = \frac{\sum_{j=1}^{4} d_j}{4}.$$

Based on the foregoing, when a second feature point set has n feature points, a central point p0 in the second feature point set is $$\left( \frac{\sum_{i=1}^{n} x_i}{n}, \frac{\sum_{i=1}^{n} y_i}{n} \right),$$

and distances between P0 and the n feature points are $$d_j = \sqrt{\left(\frac{\sum_{i=1}^{n} x_i}{n} - x_j\right)^2 + \left(\frac{\sum_{i=1}^{n} y_i}{n} - y_j\right)^2},$$

where j=1, ..., n. It can be learned from this that an average distance is $$\overline{d} = \frac{\sum_{j=1}^{n} d_j}{n}.$$

It should be noted that this step is an optional step. That is, the server may alternatively not sort the at least one matching picture, but use all matching pictures as second pictures, and send all the second pictures to the terminal, or randomly send one of all the second pictures to the terminal. Certainly, the server may alternatively send a special second picture to the terminal. The special second picture is a second picture with the highest definition, or the like.

308. The server sends the second picture to the terminal.

In this step, the server sends the second picture to the terminal. Optionally, in the sending process, the server also sends, for example, location coordinates of the feature points in the second feature point set of the second picture to the terminal.

The server may send only one second picture to the terminal. In this case, the second picture is a picture with the highest definition among all the second pictures. Alternatively, the server may send all or some of the second pictures to the terminal. For example, if the server has sorted the at least one second picture in descending order of definitions, in this step, the server may send N second pictures to the terminal. The N second pictures are N pictures in which the foregoing average distance is relatively large. When N=1, it means that the server sends, to the terminal, only a second picture with the largest average distance among all the second pictures that match the first picture. The second picture with the largest average distance is a second picture with the highest definition.

309. The terminal determines whether a matching failure message or a second picture sent by the server is received, and if a matching failure message is received, performs step 310; otherwise, performs step 311.

310. The terminal does not perform any operation.

311. The terminal determines a transform matrix between the second picture and the first picture.

The terminal determines the transform matrix between the second picture and the first picture, and transforms the second picture according to the transform matrix.

Specifically, the terminal calculates, according to a feature point in the first picture and a corresponding feature point in the second picture, a transform matrix between feature point sets respectively corresponding to the two feature points. The transform matrix is represented, for example, by a 3×3 matrix, and the transform matrix between the feature point sets respectively corresponding to the two feature points is the transform between the second picture and the first picture. In a transform matrix calculation process, an initial value is first calculated by using a linear algorithm such as direct linear transformation (Direct Linear Transformation, DLT), and then the transform matrix is further optimized by using a non-linear algorithm. The non-linear algorithm includes a Gauss-Newton (Gauss-Newton) algorithm, a gradient descent (Gradient Descent) algorithm, an L-M (Levenberg-Marquardt) algorithm, and the like.

312. The terminal transforms the second picture according to the transform matrix.

Specifically, a grayscale value of each point in the transformed second picture may be obtained through, for example, reverse interpolation. Transforming the second picture can eliminate a sense of transition that is caused by transformation such as rotation, translation, or scaling between the second picture and a picture currently displayed on the display screen of the terminal, that is, the first picture.

313. The terminal displays the transformed second picture.

In this step, the terminal replaces the currently displayed first picture with the transformed second picture. For details, refer to FIG. 5B.

Figure 5B:
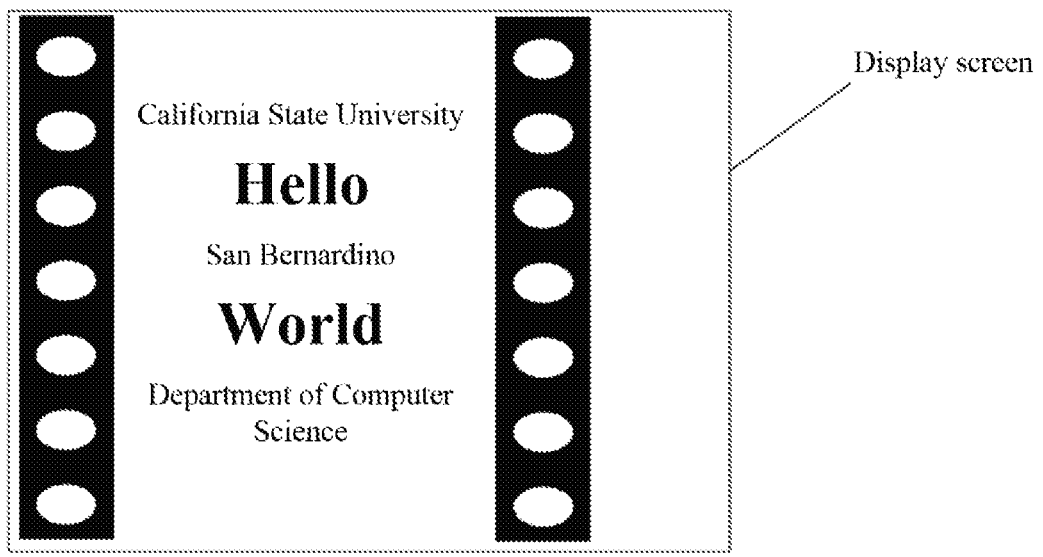
FIG. 5B is a schematic diagram of a second picture according to an embodiment of the present invention.

FIG. 5B is a schematic diagram of a second picture according to an embodiment of the present invention. As shown in FIG. 5B, for a picture that originally cannot be displayed clearly in FIG. 5A, a second picture with a high definition can be found from a server.

In this embodiment, after zooming out the first picture currently displayed on the display screen of the terminal using the maximum zooming factor supported by the terminal, the user continues zooming out the first picture, to trigger the server to find, from the stored pictures, a second picture that matches the first picture and that has a high definition and to return the second picture to the terminal, so that the terminal replaces the first picture with the second picture, and displays the second picture, so as to provide a picture with a higher definition to the user.

In the foregoing step 311, the terminal transforms the second picture according to the transformation. The following describes the foregoing transformation in detail. For details, refer to FIG. 7A to FIG. 7C.

Figure 7A:
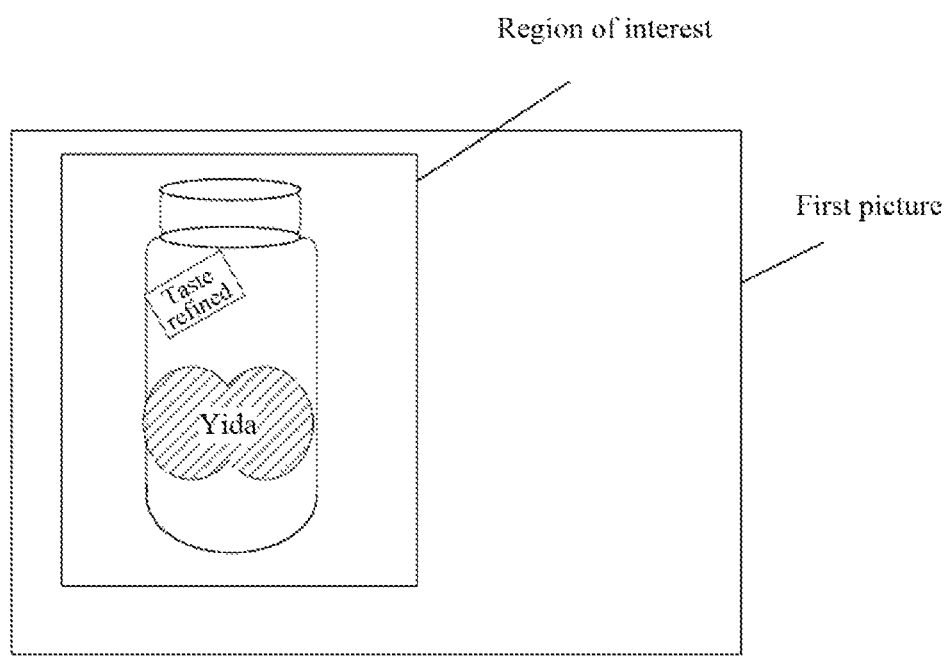
FIG. 7A is a schematic diagram of another first picture according to an embodiment of the present invention.

FIG. 7A is a schematic diagram of another first picture according to an embodiment of the present invention. Referring to FIG. 7A, a first picture is originally displayed on a display screen of a terminal, and a user wants to clearly see words on a gum pot in the first picture. After the user zooms out the first picture using a maximum zooming factor, a region displayed on the display screen of the terminal is target content of the user. At this time, the user still does not clearly see a word "Yida" on the gum pot. In this case, the terminal extracts feature points of the target content to obtain a first feature point set, and generates a feature descriptor for each feature point in the first feature point set; and the server finds, from stored pictures, a second picture that matches the first picture. For details, refer to FIG. 7B.

Figure 7B:
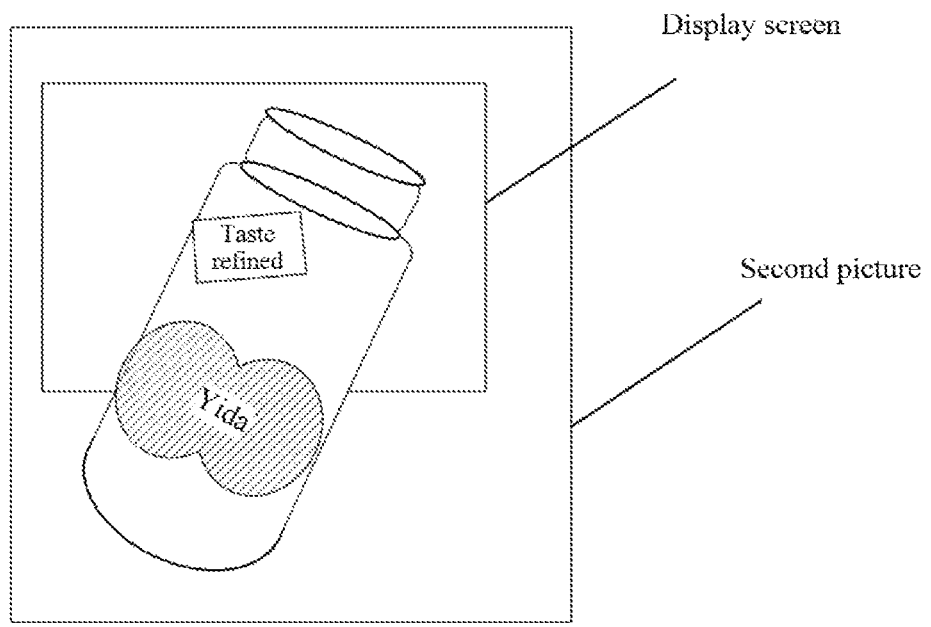
FIG. 7B is a schematic diagram of another second picture according to an embodiment of the present invention.

FIG. 7B is a schematic diagram of another second picture according to an embodiment of the present invention. Referring to FIG. 7B, a second picture returned from a server has high similarity to a first picture, that is, they are pictures that match each other. Moreover, a definition of the second picture is higher than that of target content of the first picture. Because an area of a display screen is limited, if the second picture is not transformed, a region that is of the second picture and that is displayed on the display screen is a region best matching the target content of the first picture. In this case, the user is required to perform an operation on the screen of the terminal, to display a region of real interest of the user in the second picture on the display screen. To avoid inconvenience brought by the user operation, the second picture needs to be transformed. For details, refer to FIG. 7C.

Figure 7C:
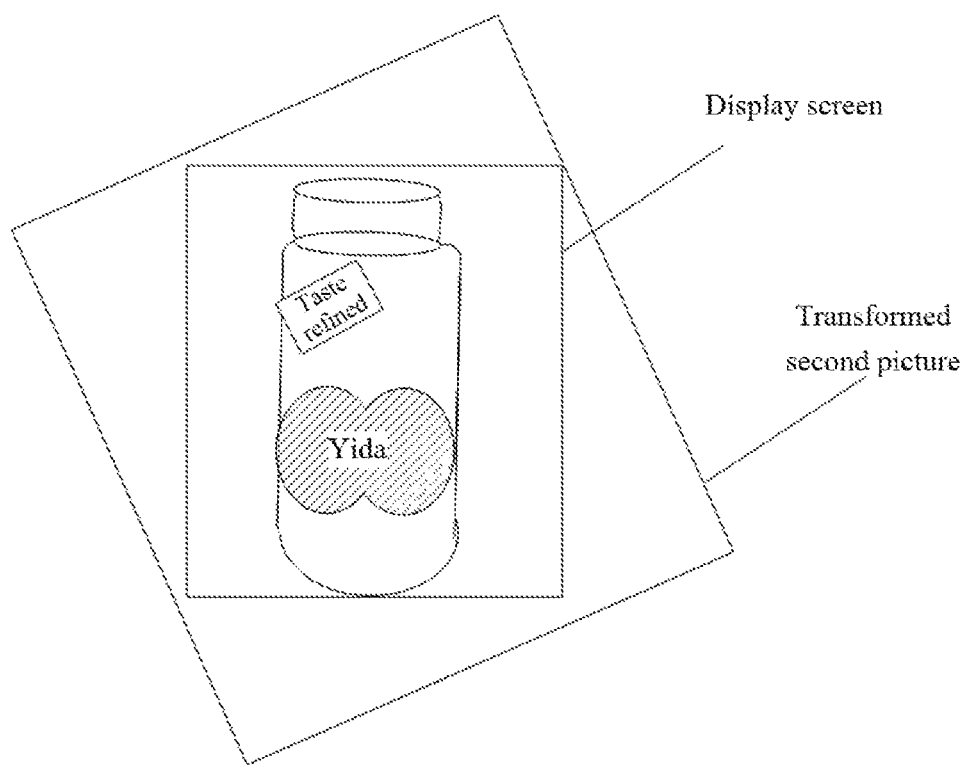
FIG. 7C is a schematic diagram of a picture that is obtained after a second picture is transformed, according to an embodiment of the present invention.

FIG. 7C is a schematic diagram of a picture that is obtained after a second picture is transformed, according to an embodiment of the present invention. Referring to FIG. 7C, after a second picture is transformed, user target content of the picture with a high definition that is returned from a server is translated, rotated, or scaled to within a display screen range of a terminal.

In addition, the steps in the foregoing FIG. 4 may be understood as a process of replacing the first picture on the terminal with the second picture in the server. It is assumed that in the foregoing step 307 in FIG. 4, the server returns only one second picture to the terminal. However, the user may request another second picture according to a requirement, that is, another preset gesture made by the user. The following describes how the terminal displays a next picture or a preceding picture according to a user requirement. For details, refer to FIG. 5C, FIG. 8A, and FIG. 8B.

Figure 5C:
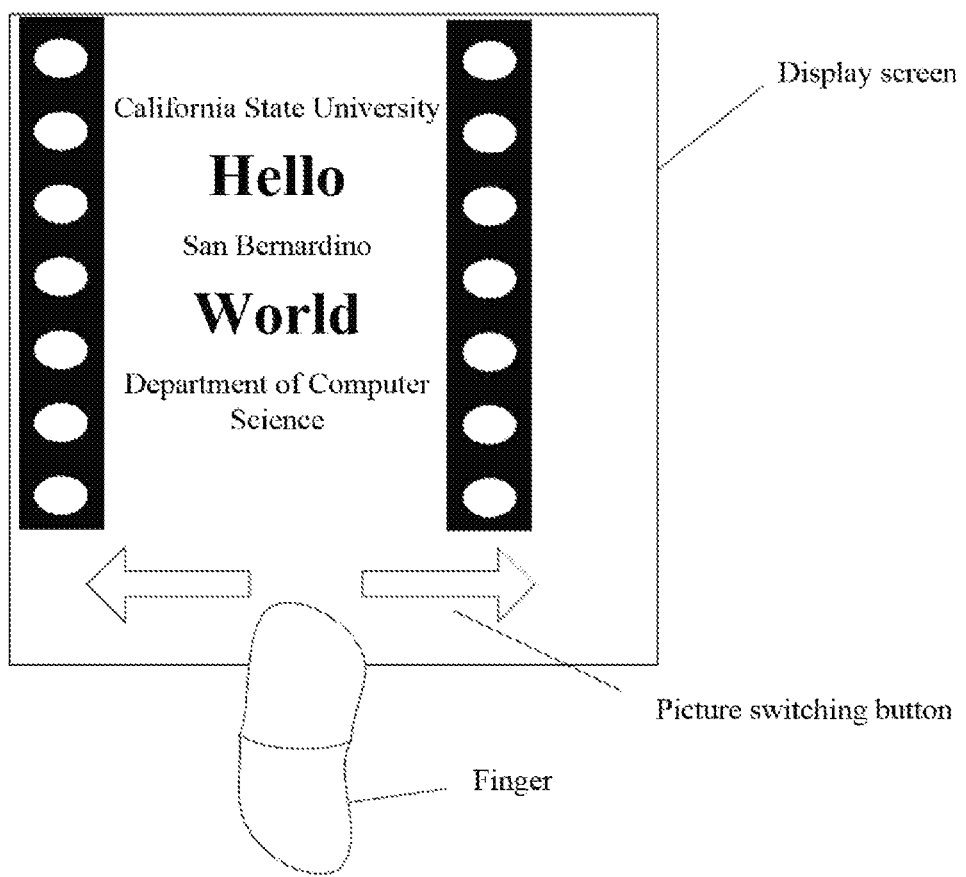
FIG. 5C is a schematic diagram of second picture switching according to an embodiment of the present invention.

FIG. 5C is a schematic diagram of second picture switching according to an embodiment of the present invention. As shown in FIG. 5C, it is assumed that pressing a right key by a user represents obtaining a next second picture whose definition is lower than that of a current second picture from the server, where FIG. 8A can be referenced for a specific procedure; and that pressing a left key represents returning to a previously displayed picture, where FIG. 8B can be referenced for a specific procedure. The right key is a right arrow button, or may be a slide-left operation in the case of a touchscreen; and the left key is a left arrow button, or may be a slide-right operation in the case of a touchscreen. Pressing the right key, pressing the left key, sliding to the right, sliding to the left, or the like may be understood as another preset gesture.

Figure 8A:
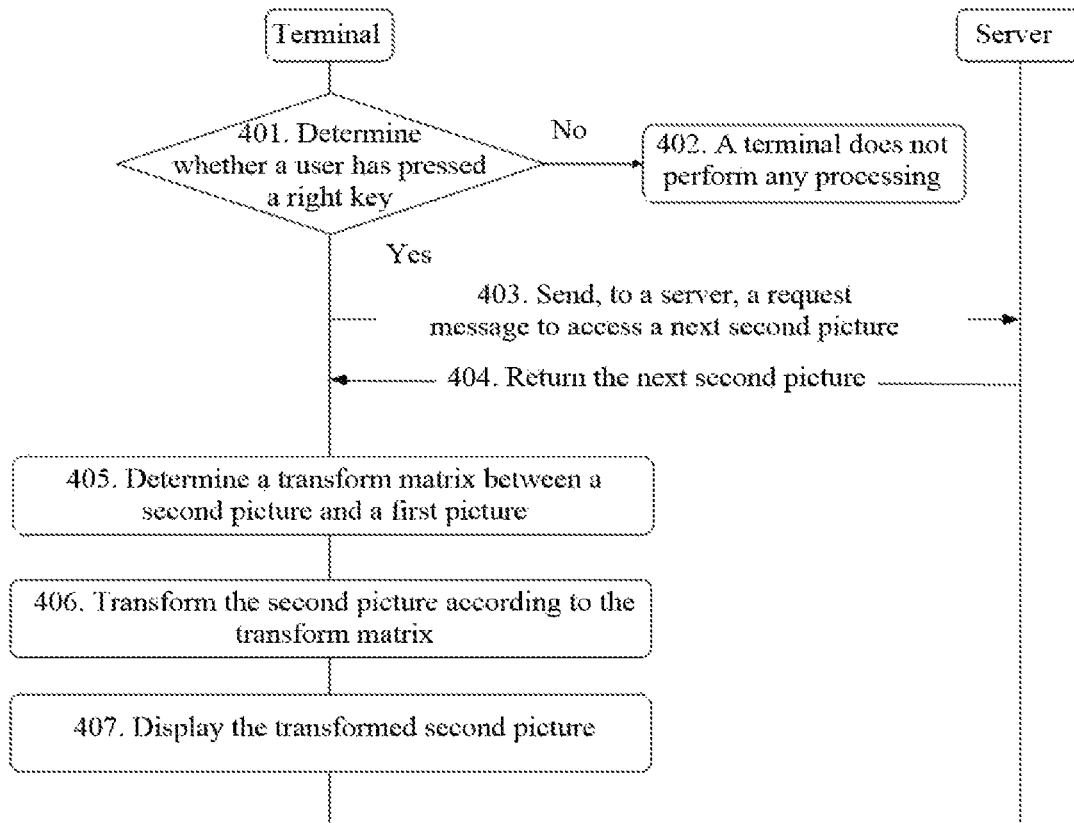
FIG. 8A is a flowchart of requesting a next second picture according to an embodiment of the present invention.

FIG. 8A is a flowchart of requesting a next second picture according to an embodiment of the present invention. This embodiment of the present invention includes the following steps:

401. A terminal determines whether a user has pressed a right key, and if the user has not pressed the right key, performs step 402; otherwise, performs step 403.

If the user has pressed a right arrow button, it indicates that the user needs to access a next second picture. A definition of the second picture is lower than that of a second picture previously returned by the server to the terminal.

402. The terminal does not perform any processing.

403. The terminal sends, to a server, a request message to access a next second picture.

404. The server returns the next second picture to the terminal.

A definition of the second picture returned by the server to the terminal is lower than that of the second picture previously returned by the server to the terminal. In the sending process, the server also sends, for example, a location coordinate of each feature point in a second feature point set of the second picture with a lower definition to the terminal.

405. The terminal determines a transform matrix between a second picture and the first picture.

The second picture may be understood as a second picture returned to the terminal after the server receives from the terminal a request to display a next picture.

406. The terminal transforms the second picture according to the transform matrix.

407. The terminal displays the transformed second picture.

Figure 8B:
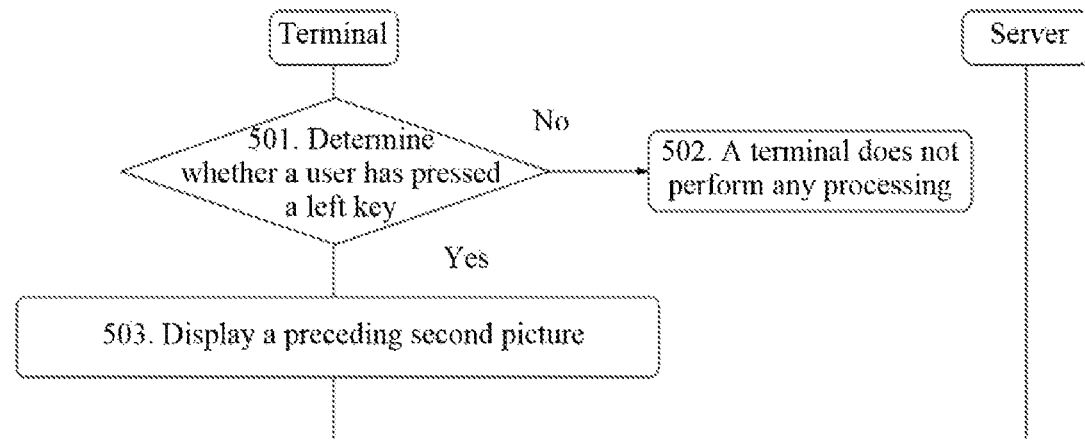
FIG. 8B is a flowchart of requesting to return to a preceding second picture, according to an embodiment of the present invention.

FIG. 8B is a flowchart of requesting to return to a preceding second picture, according to an embodiment of the present invention. This embodiment of the present invention includes the following steps:

501. A terminal determines whether a user has pressed a left key, and if the user has not pressed the left key, performs step 502; otherwise, performs step 503.

Specifically, in this step, if the user has pressed a left arrow button, it represents that the user needs to return to a preceding second picture.

502. The terminal does not perform any processing.

503. The terminal displays a preceding second picture.

In the foregoing embodiment in FIG. 4, the preset gesture is specifically a zoom-out gesture. In another embodiment, the preset gesture may alternatively be a circle gesture. For details, refer to FIG. 8.

Figure 9:
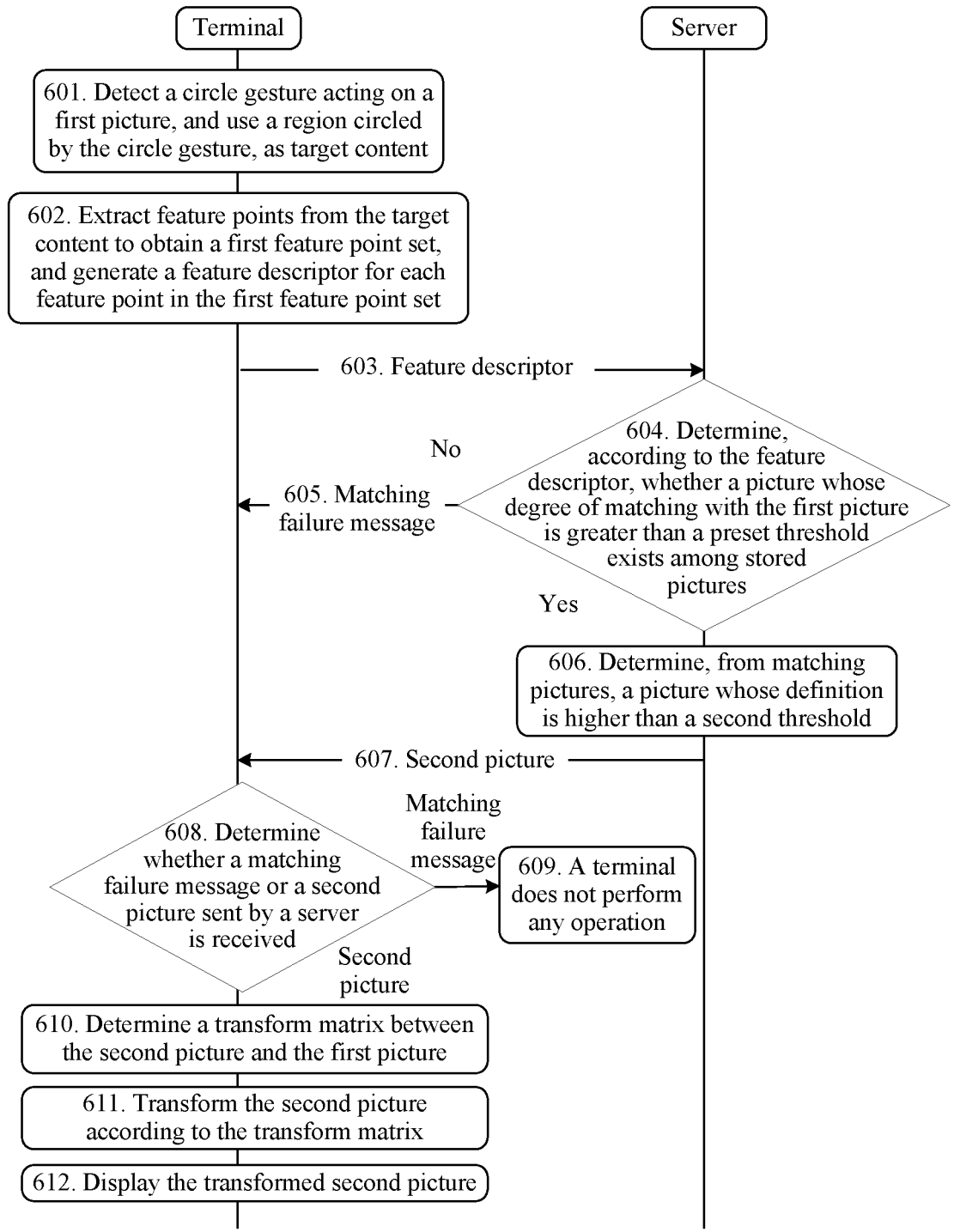
FIG. 9 is a schematic diagram of another picture display method according to an embodiment of the present invention.

FIG. 9 is a schematic diagram of another picture display method according to an embodiment of the present invention. In this embodiment, a preset gesture is specifically a circle gesture. This embodiment of the present invention includes the following steps.

601. A terminal detects a circle gesture acting on the first picture, and uses a region circled by the circle gesture, as target content.

A user circles a specific region from the first picture using the circle gesture. Correspondingly, in response to the circle gesture, the terminal uses the region that is of the first picture and that is circled by the circle gesture, as the target content.

It should be noted that the circle gesture means that a closed circle or a non-closed circle is drawn on a display screen. When a non-closed circle is drawn by the circle gesture, the terminal obtains a closed circle according to the non-closed circle, and uses the closed circle as the target content.

This step may be understood as a process of circling, by the user by using an input/output module of the terminal, a region that is not displayed clearly.

602. Extract feature points from the target content to obtain a first feature point set, and generate a feature descriptor for each feature point in the first feature point set.

603. Send the feature descriptor to a server.

For details, refer to step 304 in FIG. 4.

604. The server determines, according to the feature descriptor, whether a picture whose degree of matching with the first picture is greater than a preset threshold exists among stored pictures, and if the picture exists among the stored pictures, performs step 606; otherwise, performs step 605.

605. The server sends a matching failure message to the terminal.

606. The server determines, from matching pictures, a picture whose definition is higher than a second threshold.

For details, refer to step 307 in FIG. 4.

607. Send the second picture to the terminal.

For details, refer to step 308 in FIG. 4.

608. The terminal determines whether a matching failure message or a second picture sent by the server is received, and if a matching failure message is received, performs step 609; otherwise, performs step 610.

609. The terminal does not perform any operation.

610. The terminal determines a transform matrix between the second picture and the first picture.

The second picture may be understood as a second picture to be displayed on the terminal.

For details, refer to step 313 in FIG. 4.

611. The terminal transforms the second picture according to the transform matrix.

612. The terminal displays the transformed second picture.

In this embodiment of the present invention, after the user selects a specific region that is of the first picture and that cannot be seen clearly, the terminal uses the selected region as the target content, and triggers the server to find, in the stored pictures, a second picture that matches the first picture and that has a high definition and to return the second picture to the terminal, so that the terminal replaces the first picture with the second picture and displays the second picture, so as to provide a picture with a higher definition to the user.

In the foregoing embodiments, there is at least one second picture. When the second picture is returned, if only one second picture is returned, the terminal displays only the one second picture; or if a plurality of second pictures are returned, the terminal displays each of the at least one second picture in a scrolling manner, or the terminal may simultaneously display the at least one second picture.

Figure 10A:
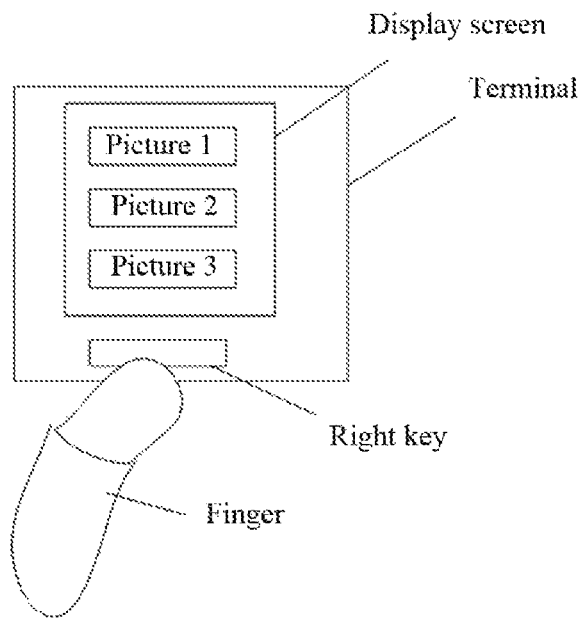
FIG. 10A is a schematic diagram of stopping displaying in a scrolling manner, according to an embodiment of the present invention.
Figure 10B:
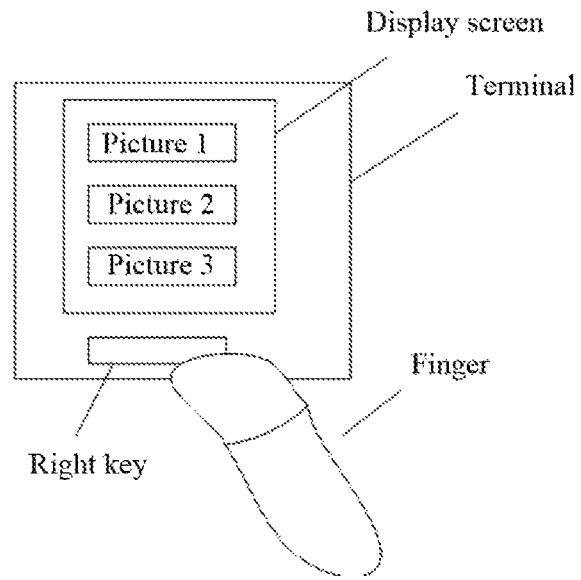
FIG. 10B is another schematic diagram of stopping displaying in a scrolling manner, according to an embodiment of the present invention.

When displaying a plurality of second pictures in a scrolling manner, if detecting a first operation acting on one picture of the at least one second picture, the terminal responds to the first operation, and zooms out and displays the picture corresponding to the first operation. The first operation is, for example, pressing a specific key on the terminal or a specific region on the display screen by using a finger of the user. For details, refer to FIG. 10A and FIG. 10B. FIG. 10A is a schematic diagram of stopping displaying in a scrolling manner, according to this embodiment of the present invention, and FIG. 10B is another schematic diagram of stopping displaying in a scrolling manner, according to this embodiment of the present invention.

As shown in FIG. 10A, second pictures displayed on a display screen in a scrolling manner include a picture 1, a picture 2, and a picture 3. If the user presses a specific key, for example, presses a home key, the scrolling is stopped. As shown in FIG. 10B, if the user presses a specific region, for example, a region in which the picture 3 is located, the scrolling is stopped and the picture 3 is zoomed out and displayed.

In addition, when simultaneously displaying a plurality of second pictures, if detecting a second operation acting on one of the at least one second picture, the terminal zooms out and displays the picture corresponding to the second operation.

Figure 11:
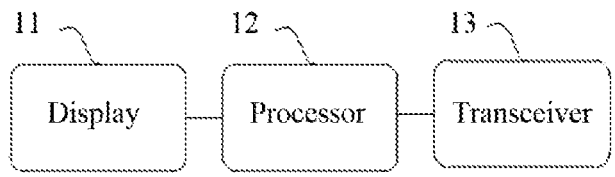
FIG. 11 is a schematic structural diagram of a terminal according to an embodiment of the present invention.

FIG. 11 is a schematic structural diagram of a terminal according to an embodiment of the present invention. The terminal provided in this embodiment of the present invention may implement the steps of the method that is applied to a terminal and that is provided in any one of the embodiments of the present invention. Specifically, the terminal provided in this embodiment of the present invention includes:

a display 11, configured to display a first picture; and a processor 12, configured to: detect a preset gesture acting on the first picture, and trigger the following events in response to the preset gesture: determining target content of the first picture according to the preset gesture, obtaining feature information of the target content, and obtaining one or more second pictures according to the feature information, where a matching degree between the second picture and the first picture is greater than a preset threshold, and a definition of the second picture is higher than that of the first picture, where the display 11 is further configured to display at least one of the one or more second pictures.

The terminal provided in this embodiment of the present invention obtains the feature information of the target content of the first picture; obtains, according to the feature information, the one or more second pictures whose degree/degrees of matching with the first picture is/are greater than the preset threshold and whose definition/definitions is/are higher than that of the first picture; and then displays the second picture, so as to provide a picture with a higher definition to a user.

Optionally, the feature information includes a feature descriptor, and the obtaining feature information of the target content includes:

extracting feature points from the target content to obtain a first feature point set, and generating a feature descriptor for each feature point in the first feature point set.

Optionally, that a definition of the second picture is higher than that of the first picture includes that:

feature points that are among feature points in the second picture and that match feature points in the first feature point set form a second feature point set, an average distance between the feature points and a central point that are in the second feature point set is greater than the second threshold, the central point is an average value of coordinates of the feature points in the second feature point set, and a distance between each feature point and the central point is a quantity of pixels between the feature point and the central point, where the second threshold is an average distance between the feature points and a central point that are in the first feature point set.

Optionally, the preset gesture is a zoom-out gesture, and the processor 12 is specifically configured to use display content on the display screen as the target content.

Optionally, the preset gesture is a circle gesture, and the processor 12 is specifically configured to use content circled by the circle gesture, as the target content.

Optionally, the feature information further includes at least one of Global Positioning System GPS information or inertial measurement unit IMU information.

Optionally, the display 11 is specifically configured to display a picture with the highest definition among the one or more second pictures, or display all of the one or more second pictures; or display at least one of the one or more second pictures in a scrolling manner.

Optionally, when the display 11 specifically displays the picture with the highest definition among the one or more second pictures, the processor 12 is further configured to: detect another preset gesture acting on the display 11, and responds to the another preset gesture, to enable the display 11 to display another second picture, where a definition of the another second picture is less than that of the picture with the highest definition.

Optionally, the processor 12 is further configured to: before the display 11 displays the at least one second picture of the one or more second pictures, determine a transform matrix between the at least one second picture and the first picture; and transform the at least one second picture according to the transform matrix; and the display 11 is specifically configured to display the transformed at least one second picture.

Optionally, the processor 12 is specifically configured to obtain the one or more second pictures from a memory of the terminal according to the feature information; or obtain the one or more second pictures from a server according to the feature information.

Optionally, still referring to FIG. 11, the terminal further includes a transceiver 13, configured to: when the processor 12 obtains no second picture from a memory of the terminal, send the feature information to a server, and receive one or more second pictures sent according to the feature information by the server.

Figure 12:
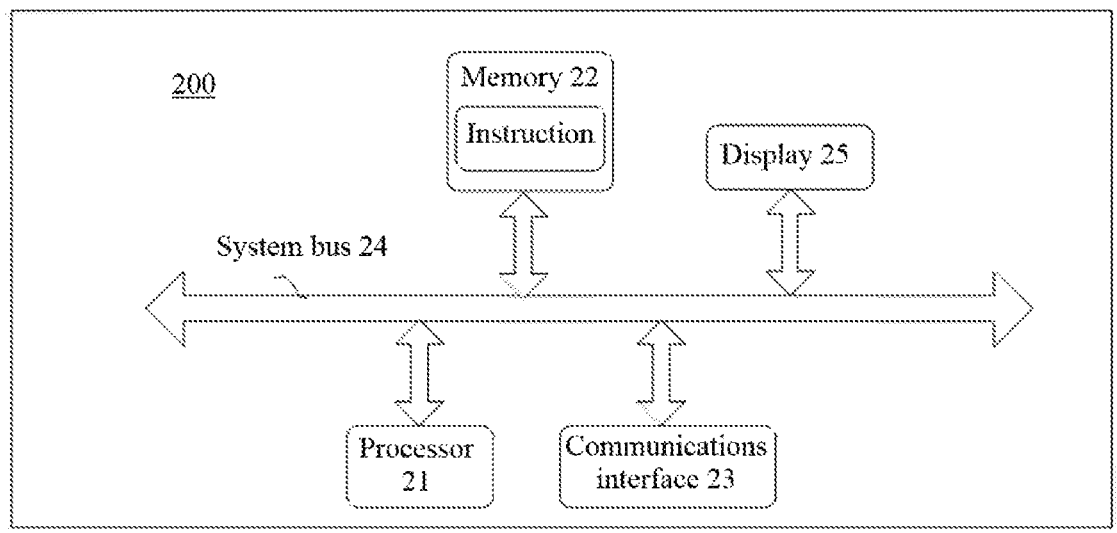
FIG. 12 is a schematic structural diagram of another terminal according to an embodiment of the present invention.

FIG. 12 is a schematic structural diagram of another terminal according to an embodiment of the present invention. The terminal 200 provided in this embodiment includes a processor 21, a memory 22, a communications interface 23, a system bus 24, and a display 25. The memory 22 and the communications interface 23 are connected to and communicate with the processor 21 by using the system bus 24, the memory 22 is configured to store a computer-executable instruction, the communications interface 23 is configured to communicate with another device, and the processor 21 is configured to run the computer-executable instruction, to cause the terminal 200 to perform the step of the foregoing method applied to a terminal.

Figure 13:
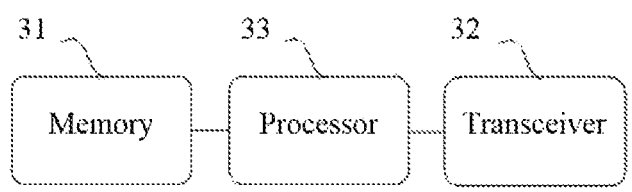
FIG. 13 is a schematic structural diagram of a server according to an embodiment of the present invention.

FIG. 13 is a schematic structural diagram of a server according to an embodiment of the present invention. The server provided in this embodiment of the present invention may implement the steps of the method that is applied to a server and that is provided in any one of the embodiments of the present invention. Specifically, the server provided in this embodiment of the present invention includes:

a memory 31, configured to store a picture;

a transceiver 32, configured to receive feature information that is of target content and that is sent by a terminal, where the target content is determined by the terminal from a first picture according to a preset gesture, and the first picture is displayed on a display screen of the terminal; and a processor 33, configured to obtain one or more second pictures according to the feature information, where a matching degree between the second picture and the first picture is greater than a preset threshold, and a definition of the second picture is higher than that of the first picture, where the transceiver 32 is further configured to send the one or more second pictures to the terminal, so that the terminal displays at least one of the one or more second pictures.

The server provided in this embodiment of the present invention receives the feature information that is of the target content and that is sent by the terminal; obtains, according to the feature information, the one or more second pictures whose degree/degrees of matching with the first picture is/are greater than the preset threshold and whose definition/definitions is/are higher than that of the first picture; and then returns the second picture to the terminal, so that the terminal displays the second picture, so as to provide a picture with a higher definition to a user.

Optionally, the feature information includes a feature descriptor, where the feature descriptor is generated, after the terminal extracts feature points from the target content to obtain a first feature point set, for each feature point in the first feature point set.

Optionally, the feature information includes the target content, and the processor 33 is further configured to: extract feature points from the target content to obtain a first feature point set, and generate a feature descriptor for each feature point in the first feature point set.

Optionally, feature points that are among feature points in the second picture and that match feature points in the first feature point set form a second feature point set, an average distance between the feature points and a central point that are in the second feature point set is greater than the second threshold, the central point is an average value of coordinates of the feature points in the second feature point set, and a distance between each feature point and the central point is a quantity of pixels between the feature point and the central point, where the second threshold is an average distance between the feature points and a central point that are in the first feature point set.

Optionally, the transceiver 32 is further configured to: before the processor 33 obtains the one or more second pictures according to the feature information, receive either Global Positioning System GPS information or inertial measurement unit IMU information that is of the first picture and that is sent by the terminal, or both; and the processor 33 is further configured to: determine a first set from the stored pictures according to the GPS information, and determine a second set from the stored pictures according to the IMU information, where a picture in the first set has the same photographing location information as the first picture, and a picture in the second set has the same photographing orientation information as the first picture; and obtain the one or more second pictures from the first set and the second set according to the feature information.

Figure 14:
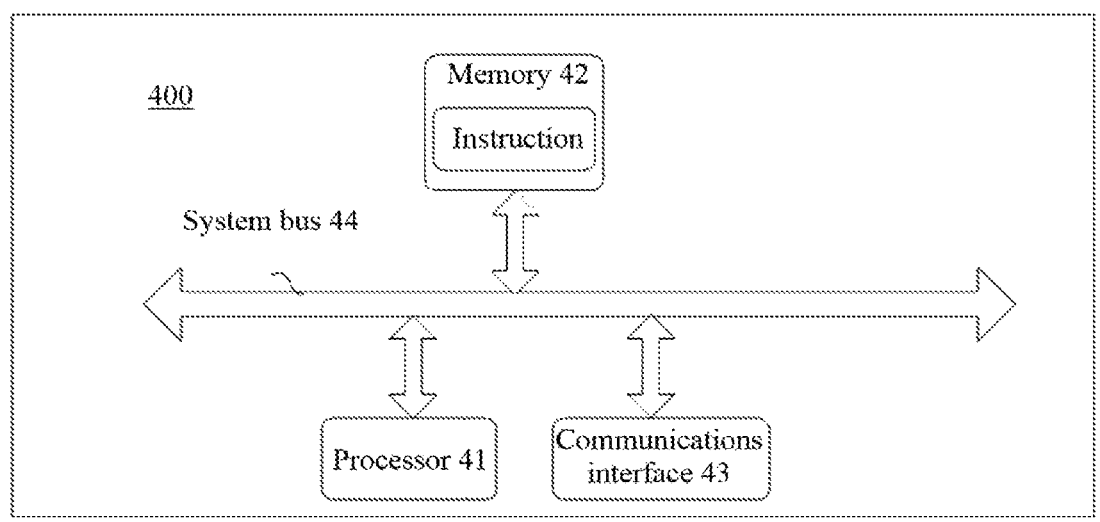
FIG. 14 is a schematic structural diagram of another server according to an embodiment of the present invention.

FIG. 14 is a schematic structural diagram of another server according to an embodiment of the present invention. The server provided in this embodiment of the present invention includes a processor 41, a memory 42, a communications interface 43, and a system bus 44. The memory 42 and the communications interface 43 are connected to and communicate with the processor 41 by using the system bus 44, the memory 42 is configured to store a computer-executable instruction, the communications interface 43 is configured to communicate with another device, and the processor 41 is configured to run the computer-executable instruction, to cause the server to perform the steps of the foregoing method applied to a server.

In addition, an embodiment of the present invention further provides a computer readable storage medium storing one or more programs. When the one or more programs are executed by a terminal, the terminal performs the steps of the foregoing method applied to a terminal.

In addition, an embodiment of the present invention further provides a graphical user interface on a terminal. The terminal includes a display, a memory, a plurality of application programs, and one or more processors configured to execute one or more programs stored in the memory; and the graphical user interface includes a user interface displayed in the foregoing method applied to a terminal.

The foregoing system bus may be a peripheral component interconnect (peripheral component interconnect, PCI) bus, an extended industry standard architecture (extended industry standard architecture, EISA) bus, or the like. The system bus may include an address bus, a data bus, a control bus, and the like. For ease of representation, only one thick line is used to represent the bus in the figure, but this does not mean that there is only one bus or only one type of bus. The communications interface is configured to implement communication between a database access apparatus and another device (such as a client, a read/write database, or a read-only database). The memory may include a random access memory (random access memory, RAM), or may further include a nonvolatile memory (non-volatile memory), for example, at least one disk memory, or may be a secure digital memory card (Secure Digital Memory Card/SD card, SD), or the like.

The processor may be a general processor, including a central processing unit (Central Processing Unit, CPU), a network processor (Network Processor, NP), or the like; or may be a digital signal processor (Digital Signal Processing, DSP), an application-specific integrated circuit (Application Specific Integrated Circuit, ASIC), a field programmable gate array (Field-Programmable Gate Array, FPGA) or another programmable logic device, a discrete gate or a transistor logic device, or a discrete hardware component.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A processing method, applied to a terminal provided with a display screen, comprising:
    displaying a first picture on the display screen;
    detecting a preset gesture acting on the first picture; and
    triggering the following events in response to the preset gesture:
        determining target content of the first picture according to the preset gesture;
        extracting feature points from the target content to obtain a first feature point set;
        obtaining feature information of the target content;
        obtaining second pictures comprising a second feature point set according to the feature information, wherein a matching degree between the second pictures and the first picture is greater than a preset threshold;
        wherein a definition of the second pictures is higher than a definition of the first picture; and
        displaying the second pictures, wherein an average distance between feature points of the second feature point set and a central point is greater than a second threshold.

2. The method of claim 1, wherein the feature information comprises one or more feature descriptors, and obtaining the feature information of the target content comprises generating a feature descriptor for each feature point in the first feature point set.

3. The method of claim 1, wherein the preset gesture is a zoom-out gesture, and determining the target content of the first picture according to the preset gesture comprises setting display content on the display screen as the target content.

4. The method of claim 1, wherein the preset gesture is a circle gesture, and determining the target content of the first picture according to the preset gesture comprises setting content circled by the circle gesture as the target content.

5. The method of claim 1, wherein the feature information further comprises Global Positioning System (GPS) information or inertial measurement unit (IMU) information.

6. The method of claim 1, wherein displaying the second pictures comprises:
    displaying a picture with a highest definition among the second pictures;
    displaying all of the second pictures; or
    displaying the second pictures in a scrolling manner.

7. The method of claim 6, wherein when displaying the second pictures comprises displaying the picture with the highest definition among the second pictures, the method further comprising:
    detecting another preset gesture acting on the display screen; and
    displaying another second picture in response to the other preset gesture, wherein a definition of the other second picture is less than a definition of the picture with the highest definition.

8. The method of claim 1, wherein before displaying the second pictures, the method further comprises:
    determining a transform matrix between the second pictures and the first picture, wherein an initial value is first calculated using a linear algorithm and wherein the transform matrix is further calculated using a nonlinear algorithm;
    transforming at least one of the second pictures according to the transform matrix to obtain a transformed at least one of the second pictures; and
    displaying the transformed at least one of the second pictures.

9. The method of claim 1, wherein obtaining the second pictures according to the feature information comprises:
    obtaining at least one of the second pictures from a memory of the terminal according to the feature information; or
    obtaining at least one of the second pictures from a server according to the feature information.

10. The method of claim 1, wherein obtaining at least one of the second pictures according to the feature information comprises:
    obtaining the at least one of the second pictures from a memory of the terminal according to the feature information when the memory comprises the at least one of the second pictures; and
    sending the feature information to a server, and receiving the at least one of the second pictures from the server according to the feature information when the memory does not comprise the at least one of the second pictures.

11. A terminal, comprising:
    a display configured to display a first picture; and
    a processor coupled to the display and configured to:
        detect a preset gesture acting on the first picture; and
        bigger the following events in response to the preset gesture:

determine target content of the first picture according to the preset gesture;

extract feature points from the target content to obtain a first feature point set;

obtain feature information of the target content; and obtain second pictures comprising a second feature point set according to the feature information, wherein a matching degree between the second pictures and the first picture is greater than a preset threshold, wherein a definition of the second pictures is higher than a definition of the first picture, wherein the display is further configured to display the second pictures, and wherein an average distance between feature points of the second feature point set and a central point is greater than a second threshold.

12. The terminal of claim 11, wherein the feature information comprises one or more feature descriptors, and wherein the processor configured for obtaining the feature information of the target content is further configured to generate a feature descriptor for each feature point in the first feature point set.

13. The terminal of claim 11, wherein the preset gesture is a zoom-out gesture, and wherein the processor is further configured to set display content on the display as the target content.

14. The terminal of claim 11, wherein the preset gesture is a circle gesture, and wherein the processor is further configured to set content circled by the circle gesture as the target content.

15. The terminal of claim 11, wherein the feature information further comprises Global Positioning System (GPS) information or inertial measurement unit (IMU) information.

16. The terminal of claim 11, wherein the display is further configured to:

display a picture with a highest definition among the second pictures;

display all of the second pictures; or display the second pictures in a scrolling manner.

17. The terminal of claim 16, wherein when the display displays the picture with the highest definition among the second pictures, and wherein the processor is further configured to:

detect another preset gesture acting on the display; and trigger the display to display another second picture in response to the other preset gesture, wherein a definition of the other second picture is less than a definition of the picture with the highest definition.

18. The terminal of claim 11, wherein the processor is further configured to:

determine a transform matrix between the second pictures and the first picture before the display displays the second pictures, wherein an initial value is first calculated using a linear algorithm, and wherein the transform matrix is further calculated using a non-linear algorithm; and transform at least one of the second pictures according to the transform matrix to obtain a transformed at least one of the second pictures, and wherein the display is further configured to display the transformed at least one of the second pictures.

19. The terminal of claim 11, wherein the processor is further configured to:

obtain at least one of the second pictures from a memory of the terminal according to the feature information; or obtain at least one of the second pictures from a server according to the feature information.

20. The terminal of claim 11, further comprising a transceiver coupled to the processor and configured to:

send the feature information to a server when the processor does not obtain a at least one of the second pictures from a memory of the terminal; and receive the at least one of the second pictures from the server according to the feature information.

* * * * *

UNITED STATES PATENT AND TRADEMARK OFFICE
CERTIFICATE OF CORRECTION

PATENT NO. : 10,838,601 B2
APPLICATION NO. : 16/308342
DATED : November 17, 2020
INVENTOR(S) : Xin Chen and Wenmei Gao It is certified that error appears in the above-identified patent and that said Letters Patent is hereby corrected as shown below:

In the Claims

Claim 11, Column 24, Line 66: "bigger the following" should read "trigger the following"

Signed and Sealed this
Fifth Day of January, 2021

Andrei Iancu
*Director of the United States Patent and Trademark Office*